May 6, 1952 C. KONRATH 2,595,469
KITCHEN COLANDER FOR EXTRACTING JUICES AND THE LIKE
Filed Jan. 13, 1949
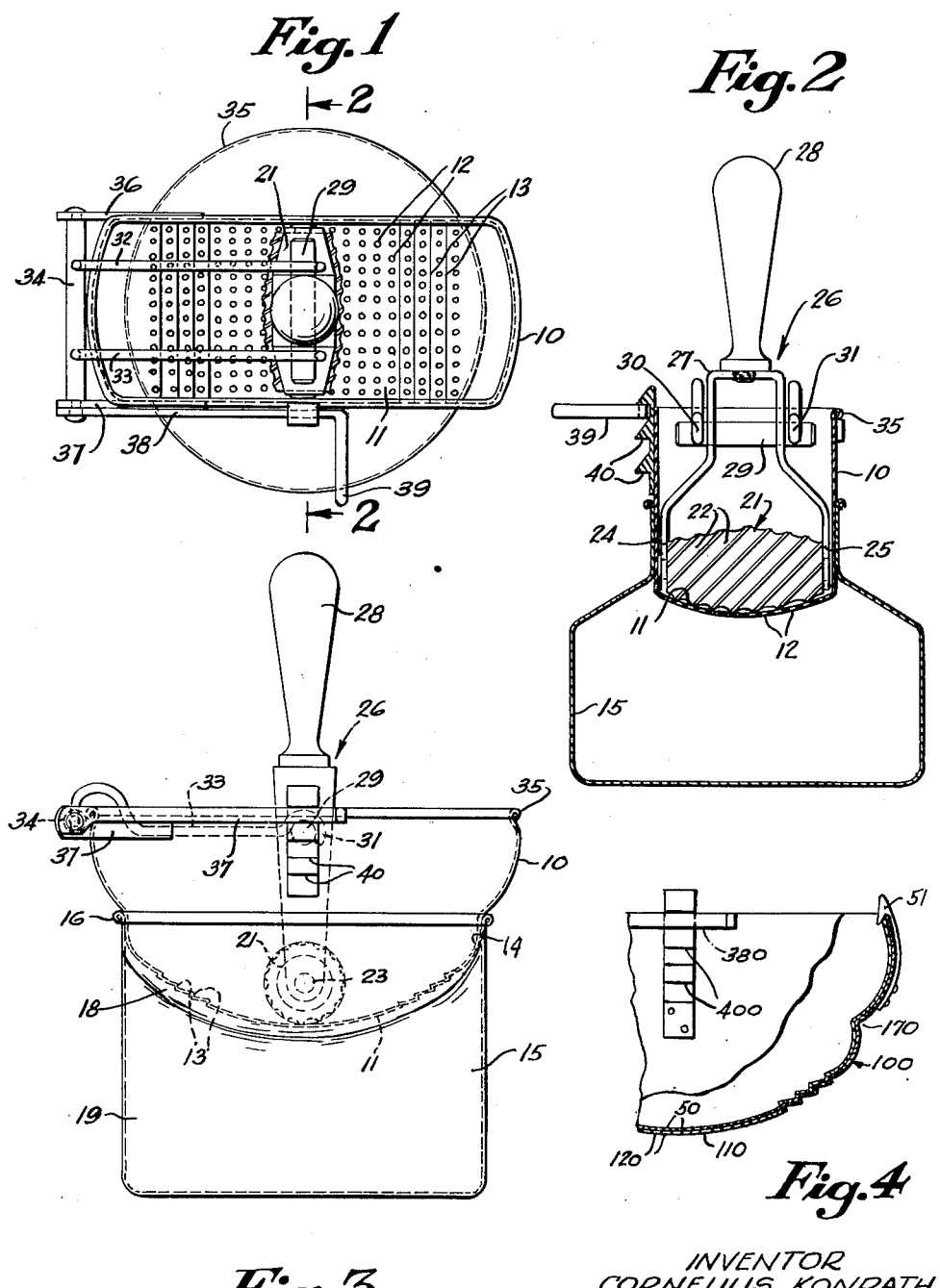
INVENTOR
CORNELIUS KONRATH
BY
ATTORNEYS Patented May 6, 1952

2,595,469

UNITED STATES PATENT OFFICE 2,595,469

KITCHEN COLANDER FOR EXTRACTING JUICES AND THE LIKE

Cornelius Konrath, Robbinsville, N. J.

Application January 13, 1949, Serial No. 70,700

1 Claim. (Cl. 146—173)

This invention relates to a press and refers more particularly to a colander or press suitable for extracting juices from and/or pressing various food stuffs, such as fruits, vegetables, including potatoes and tomatoes, dough, cheese, non-fibrous meat, such as liver, and many others.

An object of the present invention is the provision of a food press suitable for kitchens and homes, and having easily removable and replaceable pressing elements.

Another object is the provision of a utensil provided with a roller, the support of which constitutes at the same time the resilient element of the utensil.

Yet another object is the provision of a colander which is so constructed that the food stuffs located therein, which are still pushed to the edges of the bowl of the colander are compressed and will drop by gravity to the center thereof and will not adhere to the edges.

Yet another object of the invention is the provision of a food press provided with a roller which is so constructed that it will exert a concentric high pressure upon the food stuffs to be treated with the result that the food press may be used not only for treating cooked fruits and vegetables, but also fruits and vegetables which are only partially cooked, or not cooked at all, thereby preserving the vitamins, salts, and other nutritious values contained therein.

Yet another object is the provision of a colander which is so constructed that its roller with the roller support can be easily removed and eventually used as a crusher or pestle, suitable, for example, for crushing large pieces of potatoes at the beginning of the operation.

Other objects of the invention will become apparent in the course of the following specification:

The objects of the present invention may be realized through the provision of a roller having spiral ribs and grooves, and cooperating with a sieve or container provided with steps or ribs. The spiral grooves of the roller are adapted to hold the food particles and to prevent them from moving outwardly while the step-wise arrangement of the container prevents the movement of the food stuffs ahead or in front of the roller. The edges of the container of sieve are suitably curved so that the food particles located close to such edges will be compressed and will drop toward the middle of the container.

The roller is conveniently supported and pressed downwardly upon arms constituting a resilient leverage, thereby making it possible to conveniently adjust the pressure of the roller to the material to be treated, without exerting any pressure by hand.

Thus the considerable pressure of the ribbed roller upon the food stuffs is exerted by springs, thereby considerably easing and facilitating the operation. These springs are operated along with an arm firmly connected therewith and are firmly held by a projection. The pressure can be further increased by pressing the arm further downwardly until it is held by some other projection located below the first-mentioned one. The sieve is round in form and corresponds to the form of the receiving vessel so that at the end of the operation the pulp located upon the under-side of the sieve can be conveniently removed by a swiping movement at the edge of the receiving vessel.

The invention will appear more clearly from the following detailed description, when taken in connection with the accompanying drawing showing, by way of example, a preferred embodiment of the inventive idea.

In the drawings:

Figure 1 is a top view of a food press constructed in accordance with the principles of the present invention.

Figure 2 is a sectional view along the line 2—2 of Figure 1.

Figure 3 is a side view of the food press shown in Figures 1 and 2.

Figure 4 illustrates diagrammatically and in partial section a colander of a somewhat different form.

The food press, or colander, shown in Figures 1, 2, and 3 comprises a colander pan or a straining vessel 10 of substantially semi-circular form in longitudinal section. The vessel 10 has a bottom 11 provided with perforations 12 and also provided with transversely extending ribs or steps 13. The edges 14 of the pan 10 are bent inwardly so as to make it possible for food particles reaching the edges to slide or be pressed out and to drop back to the middle of the pan 10.

A juice-containing vessel 15 may be conveniently attached to the pan 10 and may be provided for this purpose with a rim 16 which fits over a depression 17 provided upon the outer surfaces of the pan 10.

The container 15 may engage the pan 10 by friction or may be firmly connected therewith by any suitable means not shown in the drawings. It is apparent that the upper portion 18 of the container 15 has an essentially angular shape conforming to that of the pan 10 while the lower portion 19 is preferably round.

The press operating in the colander includes a roller 21 which is preferably of concave form conforming to the shape of the pan. The roller 21 is provided with spiral grooves 22 extending about the entire circumference of the roller.

The roller 21 is removably mounted on an axle 23 which is supported on opposite sides by downwardly extending arms 24 and 25 of a U-shaped bracket or support 26. The central portion 27 of the support 26 is firmly connected with a handle 28. The support 26 carries a pin or axle 29 which extends through suitable openings formed in the two legs of the U-shaped member 26. The pin 29 serves as a pivot about which the roller 21 is rotated. For that purpose the pin 29 is held at its two projecting ends by hooks 30 and 31, which are integral with elongated rods 32 and 33. The rods 32 and 33 have outer ends which are imbedded in the bar 34 extending tangentially to the rim 35 of the pan 10, and firmly connected therewith by links 36 and 37. The bar 34 is swingably mounted upon the links 36 and 37 and is also connected with a rod 38 which terminates in a handle 39 and which can be placed in engagement with any one of the hooks 40 extending from one of the sides of the pan 10. This arrangement makes it possible to vary the pressure exerted by the roller 21.

In operation, cooked, partially cooked and raw food products are placed upon the bottom 11 of the pan 10 and then the user actuates the handle 28 and thereby reciprocates the roller 21 over the bottom of the pan; at the same time the springs 32 and 33 exert firm pressure upon the roller 21. It is apparent that the roller 21 will swing about the pin 29 which will serve as a pivot or fulcrum, and which is held in place by the hooks 30 and 31 of the springs 32 and 33. The food products will be pressed and strained and the juices will escape through the openings 12 and will be collected in the container 15. Pulp remaining upon the bottom 11 of the pan 10 will be subjected to the continuous action of the roller 21 since any pulp reaching the edges 14 will drop or slide down by being pressed out and by gravity to the middle of the pan.

When the work is completed the roller 21 may be quickly and easily raised by pulling upwardly at the handle 28; at that time the rods 32 and 33 will swing along with their connecting bar 34 so that it will be comparatively easy to raise the hooks 30 and 31 and withdraw the roller 21 entirely. Thereupon, the pan 10 may be raised and swiped at the edge of the vessel 15, and the pulp located therein may be removed or discarded, while the juices will be located within the container 15.

It is apparent that the spiral grooves 22 of the roller 21 will hold pits and other small particles of food stuffs so that such pits will not be crushed by the roller and thus contaminate the juices.

The rods 32 and 33 are resilient and facilitate the operation to a considerable extent, making it possible to vary the amount of pressure depending upon the type of the products. It is apparent that the illustrated shape of the pan 10 and of the container 15 considerably facilitates not only the pressing operation, but also the cleaning of the device, and a switch from one food product to another.

By the use of the described apparatus it is possible to exert a most substantial pressure upon the food products so that it is possible to use the apparatus not only for soft or cooked fruits and vegetables such as apples, tomatoes, etc., but also for raw, or partly raw, fruits and vegetables, including spinach, chestnuts, carrots, peas, beans, liver, cheese, and the like. Furthermore, the roller 21 can be removed from the rods 32 and 33 and used as a mortar and pestle.

The ribs 13 provided upon the perforated bottom 11 cooperate with the spiral grooves 21 of the roller to hold the food products and to prevent them from being pushed toward the edges of the pan, thereby facilitating and improving the operation to a substantial extent.

Figure 4 shows a pan 100 provided with a recess 170 used for holding a juice-collecting vessel (not shown). A roller which is also not shown and which is similar to the roller 21 may be connected in a similar manner with a rod 380 engaged by one of the hooks 400.

In this construction, a sieve 50 is fitted upon the bottom 110 of the pan 100. The sieve 50 is provided with perforations which are smaller than the perforations 120 of the pan 100 and which are located directly above them. The sieve has the shape of the pan 100 and can be held in place by a resilient catch 51. However, the edges of the perforated portion of the sieve may extend only to the portion of the pan indicated by the numeral 170 in Figure 4.

It is apparent that the above illustration has been given solely by way of illustration, and not by way of limitation, and that it is subject to many variations and modifications within the scope of the present invention. All such variations and modifications are to be included within the scope of the present invention.

What is claimed is:

A colander, comprising, in combination, a perforated straining pan having curved edges, a roller swingable over said pan, a U-shaped bracket having parallel legs rotatably supporting said roller, a pin carried by said legs substantially intermediate the ends thereof and having ends projecting beyond said legs, two resilient parallel arms having hook-shaped ends extending over said projecting ends of the pin and located in the middle of said pan, said arms extending from the same side of the pan, a bar firmly connected with opposite ends of said arms, means connected with said pan and swingably supporting said bar substantially tangentially to a curved edge of said pan at said side thereof, a handle connected to said U-shaped bracket substantially intermediate said legs and extending in a direction opposite to that of said roller, a rod firmly connected with said bar, and a plurality of superposed hooks located upon a side of said pan and adapted to engage selectively an end of said rod.

CORNELIUS KONRATH.

REFERENCES CITED

The following references are of record in the file of this patent:

UNITED STATES PATENTS

| Number | Name | Date |
|---|---|---|
| 88,329 | Purington | Mar. 30, 1869 |
| 307,470 | Klumpp | Nov. 4, 1884 |
| 831,187 | Ritschard et al. | Sept. 18, 1906 |
| 1,651,335 | Weiscopf | Nov. 29, 1927 |

FOREIGN PATENTS

| Number | Country | Date |
|---|---|---|
| 23,723 | Great Britain | Oct. 26, 1907 |
| 4,201 | Great Britain | Nov. 11, 1915 |
| 600,404 | France | Feb. 6, 1926 |
| 761,585 | France | Mar. 22, 1934 |